US010321107B2

(12) United States Patent
Fuchs et al.

(10) Patent No.: US 10,321,107 B2
(45) Date of Patent: Jun. 11, 2019

(54) METHODS, SYSTEMS, AND COMPUTER READABLE MEDIA FOR IMPROVED ILLUMINATION OF SPATIAL AUGMENTED REALITY OBJECTS (71) Applicant: The University of North Carolina at Chapel Hill, Chapel Hill, NC (US)

(72) Inventors: Henry Fuchs, Chapel Hill, NC (US); Gregory Welch, Longwood, FL (US)

(73) Assignee: The University of North Carolina at Chapel Hill, Chapel Hill, NC (US)

(*) Notice: Subject to any disclaimer, the term of this patent is extended or adjusted under 35 U.S.C. 154(b) by 62 days.

(21) Appl. No.: 15/036,005

(22) PCT Filed: Nov. 12, 2014

(86) PCT No.: PCT/US2014/065258
§ 371 (c)(1),
(2) Date: May 11, 2016

(87) PCT Pub. No.: WO2015/070258
PCT Pub. Date: May 14, 2015

(65) Prior Publication Data
US 2016/0323553 A1 Nov. 3, 2016

Related U.S. Application Data
(60) Provisional application No. 61/902,588, filed on Nov. 11, 2013.

(51) Int. Cl.
H04N 5/58 (2006.01)
H04N 9/31 (2006.01)
(Continued)

(52) U.S. Cl.
CPC ....... H04N 9/3194 (2013.01); G03B 21/2053 (2013.01); G03B 21/602 (2013.01);
(Continued)

(58) Field of Classification Search
CPC .. H04N 9/3194; H04N 9/3155; H04N 9/3179; G03B 21/606; G03B 21/625
See application file for complete search history.

(56) References Cited

U.S. PATENT DOCUMENTS 1,653,180 A 12/1927 Jalbert
3,973,840 A 8/1976 Jacobs et al.
(Continued)

FOREIGN PATENT DOCUMENTS

JP 06-110131 4/1994
WO WO 2007/008489 A2 1/2007
(Continued)

OTHER PUBLICATIONS

Non-Final Office Action for U.S. Appl. No. 14/401,834 (dated May 11, 2016).
(Continued)

Primary Examiner — Barry Drennan
Assistant Examiner — Khoa Vu
(74) Attorney, Agent, or Firm — Jenkins, Wilson, Taylor & Hunt, P.A.

(57) ABSTRACT

A system for illuminating a spatial augmented reality object includes an augmented reality object including a projection surface having a plurality of apertures formed through the projection surface. The system further includes a lenslets layer including a plurality of lenslets and conforming to curved regions of the of the projection surface for directing light through the apertures. The system further includes a camera for measuring ambient illumination in an environment of the projection surface. The system further includes a projected image illumination adjustment module for adjusting illumination of a captured video image. The system further includes a projector for projecting the illumina-
(Continued)

tion adjusted captured video image onto the projection surface via the lenslets layer and the apertures.

14 Claims, 3 Drawing Sheets

(51) Int. Cl.
    *G03B 21/20*        (2006.01)
    *G03B 21/602*     (2014.01)
    *G03B 21/606*     (2014.01)
    *G03B 21/625*     (2014.01)

(52) U.S. Cl.
    CPC ......... *G03B 21/606* (2013.01); *G03B 21/625* (2013.01); *H04N 5/58* (2013.01); *H04N 9/3155* (2013.01); *H04N 9/3179* (2013.01); *H04N 9/3182* (2013.01)

(56) References Cited

U.S. PATENT DOCUMENTS

| | | | |
|---|---|---|---|
| 4,076,398 | A | 2/1978 | Galbraith |
| 4,104,625 | A | 8/1978 | Bristow et al. |
| 4,978,216 | A | 12/1990 | Liljegren et al. |
| 5,221,937 | A | 6/1993 | Machtig |
| 5,465,175 | A | 11/1995 | Woodgate et al. |
| 5,502,457 | A | 3/1996 | Sakai et al. |
| 6,283,598 | B1 | 9/2001 | Inami et al. |
| 6,467,908 | B1 | 10/2002 | Mines et al. |
| 6,504,546 | B1 | 1/2003 | Cosatto et al. |
| 6,806,898 | B1 | 10/2004 | Toyama et al. |
| 6,970,289 | B1 | 11/2005 | Auerbach et al. |
| 7,068,274 | B2 | 6/2006 | Welch et al. |
| 7,095,422 | B2 | 8/2006 | Shouji |
| 7,212,664 | B2 | 5/2007 | Lee et al. |
| 7,292,269 | B2 | 11/2007 | Raskar et al. |
| 9,472,005 | B1* | 10/2016 | Marason ................ G01B 11/25 |
| 9,538,167 | B2 | 1/2017 | Welch et al. |
| 9,792,715 | B2 | 10/2017 | Welch et al. |
| 2002/0015037 | A1 | 2/2002 | Moore et al. |
| 2002/0024640 | A1 | 2/2002 | Ioka |
| 2003/0107712 | A1* | 6/2003 | Perlin ................ H04N 13/0404 353/31 |
| 2005/0017924 | A1 | 1/2005 | Utt et al. |
| 2005/0024590 | A1* | 2/2005 | Pezzaniti ........... G02B 27/2214 353/10 |
| 2005/0162511 | A1 | 7/2005 | Jackson |
| 2007/0047043 | A1* | 3/2007 | Kapellner .......... G02B 27/0944 359/30 |
| 2007/0091434 | A1* | 4/2007 | Garner ..................... H04N 5/74 359/459 |
| 2008/0018732 | A1* | 1/2008 | Moller ................. H04N 13/021 348/51 |
| 2008/0117231 | A1 | 5/2008 | Kimpe |
| 2010/0007665 | A1 | 1/2010 | Smith et al. |
| 2010/0159434 | A1 | 6/2010 | Lampotang et al. |
| 2011/0234581 | A1 | 9/2011 | Eikelis et al. |
| 2012/0038739 | A1* | 2/2012 | Welch ..................... G06T 15/04 348/14.01 |
| 2012/0093369 | A1 | 4/2012 | Ryu |
| 2013/0162521 | A1* | 6/2013 | Lee ...................... H04N 9/3173 345/156 |
| 2013/0300637 | A1* | 11/2013 | Smits ..................... G03B 35/18 345/8 |
| 2014/0226167 | A1* | 8/2014 | Smith .................... G03B 21/14 356/614 |
| 2015/0178973 | A1 | 6/2015 | Welch et al. |

FOREIGN PATENT DOCUMENTS

| | | |
|---|---|---|
| WO | WO 2008/112165 A1 | 9/2008 |
| WO | WO 2008/112212 A1 | 9/2008 |
| WO | WO 2010/102288 A2 | 9/2010 |
| WO | WO 2013/173724 A1 | 11/2013 |

OTHER PUBLICATIONS

Final Office Action for U.S. Appl. No. 13/254,837 (dated Mar. 24, 2016).
Non-Final Office Action for U.S. Appl. No. 13/254,837 (dated Jul. 17, 2015).
Advisory Action for U.S. Appl. No. 13/254,837 (dated Mar. 2, 2015).
Final Office Action for U.S. Appl. No. 13/254,837 (dated Oct. 20, 2014).
Non-Final Office Action for U.S. Appl. No. 13/254,837 (dated Mar. 17, 2014).
Notification of Transmittal of the International Search Report and the Written Opinion of the International Searching Authority, or the Declaration for International Application No. PCT/US2013/041608 (dated Aug. 22, 2013).
Notification Concerning Transmittal of International Preliminary Report on Patentability (Chapter I of the Patent Cooperation Treaty) for International Patent Application No. PCT/US2010/026534 (dated Sep. 15, 2011).
Notification of Transmittal of the International Search Report and the Written Opinion of the International Searching Authority, or the Declaration for International Patent Application No. PCT/US2010/026534 (dated Oct. 22, 2010).
Ahlberg et al., "Face tracking for model-based coding and face animation," International Journal of Imaging Systems and Technology, 13(1):8-22 (2003).
Aist, "Successful development of a robot with appearance and performance similar to humans," http://www.aist.go.jp/aist e/latest research/2009/ 20090513/20090513.html (May 2009).
Allen, "Hardware Design Optimization for Human Motion Tracking Systems," Ph.D. dissertation, The University of North Carolina at Chapel Hill, Department of Computer Science, Chapel Hill, NC, USA, pp. 1-100 (Nov. 2007) (Part 1 of 2).
Allen, "Hardware Design Optimization for Human Motion Tracking Systems," Ph.D. dissertation, The University of North Carolina at Chapel Hill, Department of Computer Science, Chapel Hill, NC, USA, pp. 101-190 (Nov. 2007) (Part 2 of 2).
Allen et al., "A general method for comparing the expected performance of tracking and motion capture systems," In VRST '05: Proceedings of the ACM symposium on Virtual reality software and technology, pp. 201-210, Monterey, CA, USA, ACM Press, New York, NY, USA (Nov. 2005).
Allen et al., "Tracking: Beyond 15 minutes of thought: Siggraph 2001 course 11," In Computer Graphics, Annual Conference on Computer Graphics & Interactive Techniques, ACM Press, Addison-Wesley, Los Angeles, CA, USA (Aug. 12-17), siggraph 2001 coursepack edition, (2001).
Androutsellis-Theotokis et al., "A survey of peer-to-peer content distribution technologies," ACM Comput. Surv., 36(4):335-371 (2004).
Azuma et al., "Tracking in unprepared environments for augmented reality systems," Computers & Graphics, 23(6):787-793 (1999).
Jebara et al., "Mixtures of Eigenfeatures for Real-Time Structure from Texture," Sixth International Conference on Computer Vision, IEEE, pp. 128-135 (1998).
Azuma, et al., "Making augmented reality work outdoors requires hybrid tracking," In First International Workshop on Augmented Reality, pp. 219-224, San Francisco, CA, USA (1998).
Azuma et al., "Space-resection by collinearity: Mathematics behind the optical ceiling head-tracker," Technical Report 91-048, University of North Carolina at Chapel Hill (Nov. 1991).
Bandyopadhyay et al., "Dynamic shader lamps: Painting on real objects," In Proc. IEEE and ACM international Symposium on Augmented Reality (ISAR '01), pp. 207-216, New York, NY, USA, IEEE Computer Society (Oct. 2001).
Biocca et al., "Visual touch in virtual environments: An exploratory study of presence, multimodal interfaces, and cross-modal sensory illusions," Presence: Teleoper. Virtual Environ.,10(3):247-265 (2001).
Bishop, "The Self-Tracker: A Smart Optical Sensor on Silicon," Ph.d. dissertation, University of North Carlina at Chapel Hill, 1984. by Gary Bishop. ill. ; 29 cm. Thesis (Ph.D.) University of North Carolina at Chapel Hill (1984).

(56) References Cited

OTHER PUBLICATIONS

DeAndrea, AskART, http://www.askart.com/askart/d/john louis de andrea/john louis de andrea.aspx (May 2009).
Epstein, "My date with a robot," ScientificAmericanMind, pp. 68-73 (Jun./Jul. 2006).
Foxlin et al., "Weartrack: a self-referenced head and hand tracker for wearable computers and portable vr," Wearable Computers, 2000. The Fourth International Symposium on, pp. 155-162 (2000).
Fretzagias et al., "Cooperative location-sensing for wireless networks," In PERCOM '04: Proceedings of the Second IEEE International Conference on Pervasive Computing and Communications (PerCom'04), p. 121, Washington, DC, USA, IEEE Computer Society (2004).
Garau et al., "The impact of avatar realism and eye gaze control on perceived quality of communication in a shared immersive virtual environment," IN CHI '03: Proceedings of the SIGCHI conference on Human factors in computing systems, pp. 529-536, New York, NY, USA, ACM (Apr. 5-10, 2003).
Garau et al., "The impact of eye gaze on communication using humanoid avatars," In CHI '01: Proceedings of the SIGCHI conference on Human factors in computing systems, pp. 309-316, New York, NY, USA, ACM (2001).
Gleicher, "Retargeting motion to new chapters," In SIGGRAPH '98: Proceedings of the 25th annual conference on Computer graphics and interactive techniques, pp. 33-42, New York, NY, USA, ACM (1998).
Hendrix et al., "Presence within virtual environments as a function of visual display parameters," Presence: Teleoperators and virtual environments, 5(3):274-289 (1996).
Honda Motor Co., Ltd. "Honda Develops Intelligence Technologies Enabling Multiple ASIMO Robots to Work Together in Coordination," Corporate News Release (Dec. 11, 2007).
Huang et al., "Visual face tracking and its application to 3d model-based video coding," In Picture Coding Symposium, pp. 57-60 (2001).
Ishiguro, "Intelligent Robotics Laboratory," Osaka University. http://www.is.sys.es.osaka-u.ac.jp/research/index.en.html (May 2009).
Jarmasz et al., "Object-based attention and cognitive tunneling," Journal of Experimental Psychology Applied, 11(1):3-12 (Mar. 2005).
Johnson et al., "A distributed cooperative framework for continuous multi-projector pose estimation," Proceedings of IEEE Virtual Reality 2009 (Mar. 14-18, 2009).
Jones et al., "Achieving eye contact in a one-to-many 3d video teleconferencing system," In SIGGRAPH '09: ACM SIGGRAPH 2009 papers, pp. 1-8, New York, NY, USA, ACM (2009).
Jones et al., "Rendering for an interactive 360° light field display," In SIGGRAPH '07: ACM SIGGRAPH 2007 papers, vol. 26, pp. 40-1-40-10, New York, NY, USA, ACM (2007).
"Various face shape expression robot," http://www.takanishi.mech.waseda.ac.jp/top/research/docomo/index.htm (Aug. 2009).
Lincoln et al., "Multi-view lenticular display for group teleconferencing," Immerscom (2009).
Looxis GmbH, "FaceWorx," http://www.looxis.com/en/k75.Downloads Bits-and-Bytes-to-downloads.htm (Feb. 2009).
Mizell et al., "Immersive virtual reality vs. flat-screen visualization: A measurable advantage," (Submitted for publication. 2003).
Mori, "The Uncanny Valley," Energy, 7(4), pp. 33-35 (1970).
Murray et al., "An assessment of eye-gaze potential within immersive virtual environments," ACM Trans. Multimedia Comput. Commun. Appl., 3(4):1-17 (2007).
Nguyen et al., "Multiview: improving trust in group video conferencing through spatial faithfulness," In CHI '07: Proceedings of the SIGCHI conference on Human factors in computing systems, pp. 1465-1474, New York, NY, USA, ACM (2007).
Nguyen et al., "Multiview: spatially faithful group videoconferencing," In CHI '05: Proceedings of the SIGCHI conference on Human factors in computing systems, pp. 799-808, New York, NY, USA, ACM (2005).
Pausch et al., "A user study comparing head-mounted and stationary displays," In Proceedings of IEEE Symposium on Research Frontiers in Virtual Reality, pp. 41-45, IEEE Press (1993).
Phillips, "On the right track a unique optical tracking system gives users greater freedom to explore virtual worlds," Computer Graphics World, pp. 16-18 (Apr. 2000).
Popovic et al., "Physically based motion transformation," In SIGGRAPH '99: Proceedings of the 26th annual conference on Computer graphics and interactive techniques, pp. 11-20, New York, NY, USA, ACM Press/Addison-Wesley Publishing Co. (1999).
Raskar et al., "Shader lamps: Animating real objects with image-based illumination," In Eurographics Work-shop on Rendering (Apr. 2000).
Raskar et al., "Table-top spatially-augmented reality: Bringing physical models to life with projected imagery," In IWAR '99: Pro-ceedings of the 2nd IEEE and ACM International Workshop on Augmented Reality, p. 64, Washington, DC, USA, IEEE Computer Society (1999).
Schreer et al., "3DPresence—A System Concept for Multi-User and Multi-Party Immersive 3D Videoconferencing," pp. 1-8. CVMP 2008 (Nov. 2008).
Seeing Machines. faceAPI. http://www.seeingmachines.com/product/ faceapi/ (May 2009).
Shin et al., "Computer puppetry: An importance-based approach," ACM Trans. Graph., 20(2):67-94 (2001).
Snow, "Charting Presence in Virtual Environments and Its Effects on Performance," PhDthesis, Virginia Polytechnic Institute and State University (Dec. 1996).
Tachi http://projects.tachilab.org/telesar2/ (May 2009).
Tachi et al., "Mutual telexistence system using retro-reflective projection technology," International Journal of Humanoid Robotics, 1(1):45-64 (2004).
Thomas et al., "Visual displays and cognitive tunneling: Frames of reference effects on spatial judgements and change detection," In Proceedings of the 45th Annual Meeting of the Human Factors and Ergonomics Society, Santa Monica, CA, Human Factors & ErgonomicsSociety (2001).
Vallidis, "WHISPER: A Spread Spectrum Approach to Occlusion in Acoustic Tracking," Ph.d., University of North Carolina at Chapel Hill (2002).
Vertegaal et al., "Explaining effects of eye gaze on mediated group conversations: amount or synchronization," In CSCW '02: Proceedings of the 2002 ACM conference on Computer supported cooperative work, pp. 41{48, New York, NY, USA, ACM (2002).
Vlasic et al., "Practical motion capture in everyday surroundings," In SIGGRAPH '07: ACM SIGGRAPH 2007 papers, p. 35, New York, NY, USA, ACM (2007).
Vlasic et al., "Face transfer with multilinear models," ACM Trans. Graph., 24(3), pp. 426-433 (2005).
Ward et al., "A demonstrated optical tracker with scalable work area for head-mounted display systems," In Symposium on Interactive 3D Graphics, pp. 43-52, Cambridge, MA USA, ACM Press, Addison-Wesley (1992).
Welch et al., "Motion tracking: No silver bullet, but a respectable arsenal," IEEE Computer Graphics Applications, 22(6), pp. 24-38 (2002).
Welch et al., "High-performance wide-area optical tracking: The hiball tracking system," Presence: Teleoperators and Virtual Environments, 10(1), pp. 1-21 (2001).
Welch et al., "The hiball tracker: High-performance wide-area tracking for virtual and augmented environments," In Proceedings of the ACM Symposium on Virtual Reality Software and Technology, pp. 1-11. ACM SIGGRAPH, Addison-Wesley, University College London, London, United Kingdom (Dec. 20-23, 1999).
Welch et al., "Scaat: Incremental tracking with incomplete information," In Turner Whitted, editor, Computer Graphics, Annual Conference on Computer Graphics & Interactive Techniques, pp. 333-344. ACM Press, Addison-Wesley, Los Angeles, CA, USA (Aug. 3-8), siggraph 97 conference proceedings edition (1997).
Welch, "SCAAT: Incremental Tracking with Incomplete Information," Ph.d. dissertation, University of North Carolina at Chapel Hill, 1996. by Gregory FrancisWelch. ill. ; 29 cm. Thesis (Ph. D.) University of North Carolina at Chapel Hill (1996).

(56) References Cited

OTHER PUBLICATIONS

Welch, "Hybrid self-tracker: An inertial/optical hybrid three-dimensional tracking system," Technical Report TR95-048, University of North Carolina at Chapel Hill, Department of Computer Science (1995).

Yonezawa et al., "Gaze-communicative behavior of stuffed-toy robot with joint attention and eye contact based on ambient gaze-tracking," In ICMI '07:Proceedings of the 9th international conference on Multimodal interfaces, pp. 140-145, New York, NY, USA, ACM (2007).

Yotsukura et al., "Hypermask: projecting a talking head onto real object," The Visual Computer, 18(2):111-120 (Apr. 2002).

You et al., "Orientation tracking for outdoor augmented reality registration," IEEE Computer Graphics and Applications, 19(6), pp. 36-42 (Nov./Dec. 1999).

You et al., "Hybrid inertial and vision tracking for augmented reality registration," In IEEE Virtual Reality, pp. 260-267, Houston, TX USA (1999).

Notice of Allowance and Fee(s) Due for U.S. Appl. No. 14/401,834 (dated Jun. 2, 2017).

Notice of Allowance and Fee(s) Due for U.S. Appl. No. 13/254,837 (dated Nov. 2, 2016).

Final Office Action for U.S. Appl. No. 14/401,834 (dated Oct. 28, 2016).

Applicant-Initiated Interview Summary for U.S. Appl. No. 13/254,837 (dated Jul. 27, 2016).

Applicant Initiated Interview Summary for U.S. Appl. No. 14/401,834 (dated May 9, 2017).

Non-Final Office Action for U.S. Appl. No. 14/401,834 (dated Mar. 10, 2017).

Johnson et al., "A Personal Surround Environment: Projective Display with Correction for Display Surface Geometry and Extreme Lens Distortion", IEEE Virtual Reality Conference 2007, pp. 147-154 (Mar. 10-14, 2007).

Notification of Transmittal of the International Search Report and the Written Opinion of the International Searching Authority, or the Declaration for International Application No. PCT/US2014/065258 (dated Mar. 26, 2015).

\* cited by examiner

FIG. 3

METHODS, SYSTEMS, AND COMPUTER READABLE MEDIA FOR IMPROVED ILLUMINATION OF SPATIAL AUGMENTED REALITY OBJECTS

PRIORITY CLAIM

This application claims the priority benefit of U.S. Provisional Patent Application Ser. No. 61/902,588, filed Nov. 11, 2013, the disclosure of which is incorporated by reference herein in its entirety.

TECHNICAL FIELD

The subject matter described herein relates to projecting images onto spatial augmented reality objects. More particularly, the subject matter described herein relates to methods, systems, and computer readable media for improved illumination of spatial augmented reality objects.

BACKGROUND

Augmented reality refers to the augmentation (or supplementation) of a user's sensory input by computer-generated enhancements, most often sight and sound. Spatial augmented reality refers to such augmentation that is delivered in the user's physical space directly, most often by a projection onto an object in the user's physical space. For example, a mannequin's face can be augmented by a video projection of a distant live person's face, giving the illusion of the mannequin talking.

A major drawback of current spatial augmented reality techniques is that the object of augmentation appears to glow unnaturally. This is caused by the fact that the object is lighted both by the ambient illumination in the environment (which is needed to light rest of the user's surroundings) and also lighted by the projector that is doing the augmentation.

Accordingly, there exists a long felt need for methods, systems, and computer readable media for improved illumination of spatial augmented reality objects.

SUMMARY

The subject matter described herein improves the spatial augmented reality techniques in at least two ways: 1) the projection surface is improved by a non-reflecting black coating broken up by an array of apertures behind which is a layer of optical lenslets optimized for the geometry of the rear-mounted projector and the geometry of the surface of the augmented object, and 2) a camera is placed at the same optical location as the projector so that the ambient illumination falling upon the various parts of the augmented surface can be measured and used in software to more accurately calculate the proper augmented projector illumination so that the augmented surface (not the un-augmented surface) appears to be properly illuminated by the ambient physical illumination.

A system for illuminating a spatial augmented reality object includes an augmented reality object including a projection surface having a plurality of apertures formed through the projection surface. The system further includes a lenslets layer including a plurality of lenslets and conforming to curved regions of the projection surface for directing light through the apertures. The system further includes a camera for measuring ambient illumination in an environment of the projection surface. The system further includes a projected image illumination adjustment module for adjusting illumination of a captured video image. The system further includes a projector for projecting the illumination adjusted captured video image onto the projection surface via the lenslets layer and the apertures.

The subject matter described herein may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
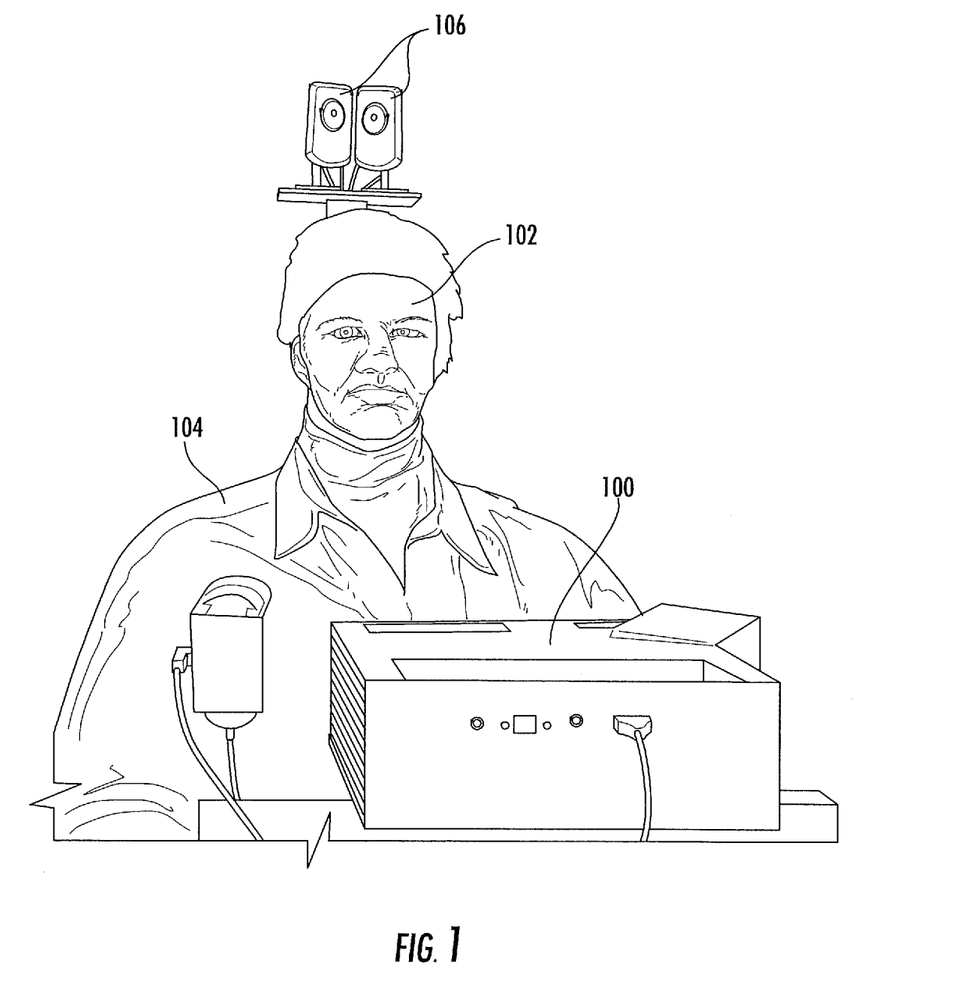
FIG. 1 is a front view of a mannequin with a video image projected onto the face of the mannequin.

Projecting images onto the surfaces of physical objects in an environment offers several potential advantages over projecting images onto conventional projection screens. As just one example, if the generic head-shape of a life-sized mannequin is projected with a live video of a distant participant, that distant participant might be accepted as more effective participant in local meetings than if that same participant's video were to appear on a conventional projection screen (see FIG. 1). In FIG. 1, a projector 100 projects an image 102 onto the face of a mannequin 104. Projector 100 is located in front of and outside of the body of mannequin 104. As a result of ambient light in the local environment of mannequin 104 reflected from the outer surface of mannequin 104 combined with the projected image, which is illuminated by the ambient light in the remote location where the video image of the remote user is captured, image 102 projected onto the face of mannequin 104 may appear to glow. The glowing or other illumination that does not match the illumination in the local environment of mannequin 104 make the projection of the remote user's image onto mannequin 104 appear unrealistic. One or more cameras 106 may be located in the local environment of mannequin 104 to display the local environment of mannequin 104 to the remote participant.

Additional benefits may accrue if, in addition to the video images being projected onto the mannequin's head, mannequin 104 could move its head orientation, its arms and torso to mimic those of the distant participant. The methods and systems described herein may be used to more realistically illuminate an augmented reality object, such as mannequin 104, when mannequin 104 is immobile or when mannequin 104 or other augmented reality object includes moving parts to mimic movements of a distant participant.

As stated above, projector 100 that illuminates the object (the head in FIG. 1 can be located in front of the object (as in FIG. 1) or behind the object—usually inside the head, in rear-projection mode.

One problem ameliorated by the subject matter described herein is the unnatural appearance of the augmented object, that it appears to "glow" as if illuminated by an unnatural light. It is illuminated, of course, but has an unnatural appearance that makes the augmented face look very different than the human faces near it. This is caused by at least two effects:

1) The projection surface reflects not just the projector's light but also the ambient light in the room as well. Thus, for example, black parts of the augmented object are not black, but are the natural color of the augmented surface (for example, white or light grey). Thus, to get good contrast within the imagery on the augmented surface, the projector needs to illuminate the light-colored augmented areas with significant amount of light, to overpower the ambient light which is illuminating the dark and light areas equally.

2) The direction and balance of apparent lighting on the augmented head (it appears to be lighted from the right side in FIG. 1) does not match the lighting in the actual room. The light in the actual room in FIG. 1 appears to be softer and mostly from the left.

The subject matter described herein ameliorates Problem 1 by drastically reducing the amount of ambient light that is reflected off the augmented surface while at the same time allowing almost all the (rear-) projected light to illuminate the augmented surface. Thus, virtually all the light coming from the augmented surface will be that which is coming from the rear-mounted projector. Problem 2 is ameliorated by measuring the ambient illumination in the local environment of the augmented reality object via one (or more) cameras mounted inside the augmented surface and using that information to relight the augmented image from its captured geometry and illumination. Relighting the augmented image from its captured geometry and illumination may include changing the illumination of the captured image to match the ambient lighting of the local environment so that the captured image appears to be lit from light sources in the local environment, rather than those in the remote environment. Such changes in illumination may include changing the direction and intensity of illumination of pixels in the captured image for displaying the captured image on the augmented reality surface.

Figure 2:
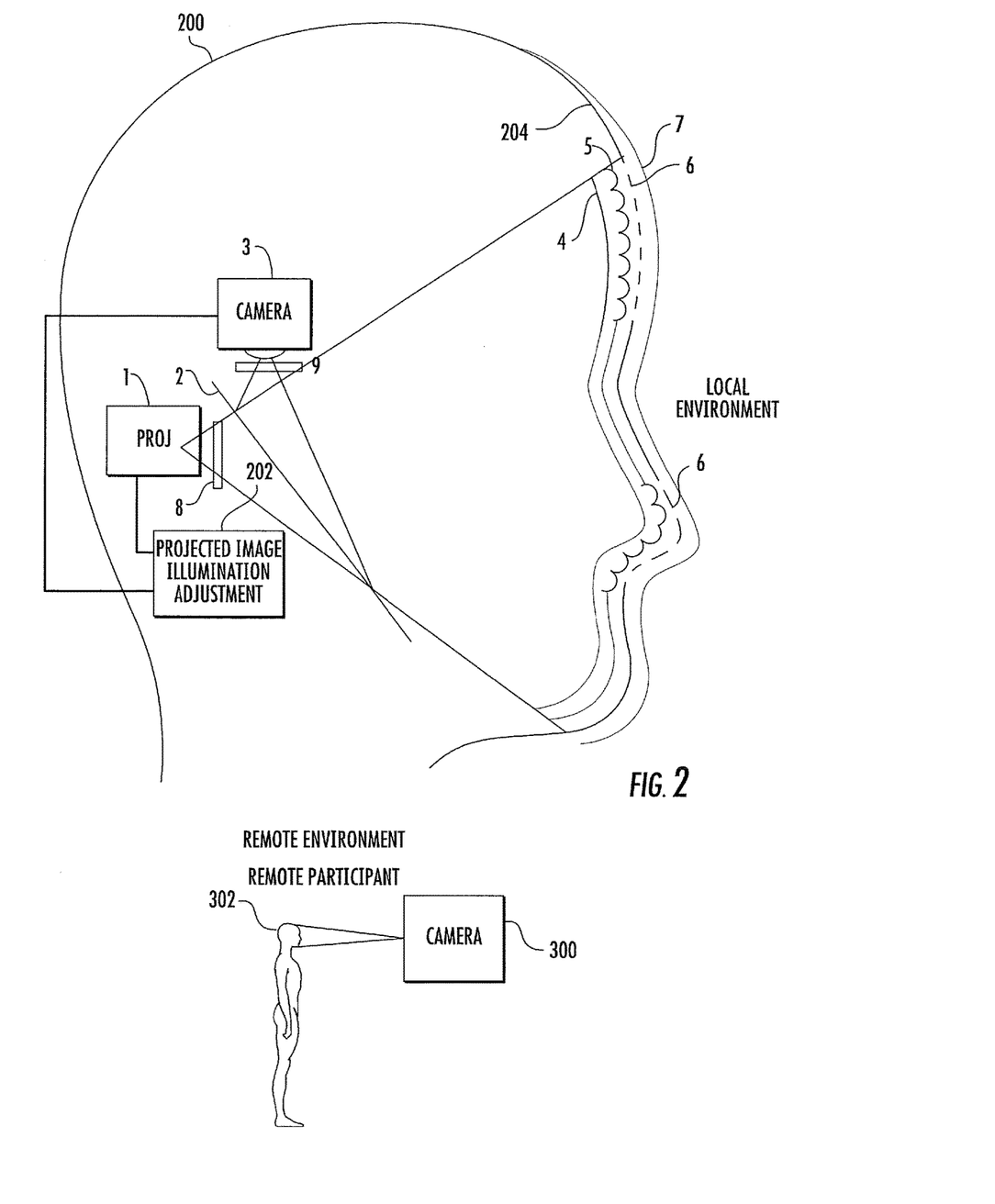
FIG. 2 is a schematic diagram of a system for improved illumination of a spatial augmented reality object according to an embodiment of the subject matter described herein.

FIG. 2 is a diagram illustrating an augmented reality object suitable for spatial illumination and in a manner that compensates for ambient light according to an embodiment of the subject matter described herein. Referring to FIG. 2, augmented object 200 comprises a model of a human head, which may be part of a mannequin, as illustrated in FIG. 1. However, rather than illuminating augmented object 200 using a projector that does not compensate for ambient illumination, the subject matter described herein includes a camera that measures augmented illumination and a projector illumination adjustment module that automatically adjusts projector illumination based on the measured ambient illumination.

In FIG. 2, augmented reality object 200 includes a projector 1 for projecting desired images onto an augmented surface. For example, projector 1 may project video images of a human face onto the augmented object 200. The video images may be captured in a remote environment using a camera 300 that obtains video images of a remote participant 302 to a meeting. The remote environment may be a different room, a different building, or other different physical location from the local environment of augmented object 200. Camera 300 may be communicatively coupled to projector 1 so that projector 1 can re-project the images obtained from camera 300. In the illustrated example, projector 1 illuminates augmented reality object 200 from within augmented reality object 200.

Augmented reality object 200 further includes a camera 3 for measuring ambient illumination in the local environment. The ambient illumination may be caused by light sources, such as ceiling mounted lights or natural lighting in the local environment. A beam splitter 2 allows camera 3 to measure the ambient illumination. In FIG. 2, augmented reality object 200 includes a projection surface 204 in which is formed arrays 6 of apertures through which the projected image is output into the local environment.

Augmented surface 204 may be covered with non-reflecting flat black coating except for aperture arrays 6, in a manner similar to the technique described in U.S. Pat. No. 6,970,289 B1 (Screen for Rear Projection Display), the disclosure of which is incorporated herein by reference in its entirety. In front of this coating is a transparent protective layer 7. Behind this coating is a layer 5 of tiny lenslets, one behind each pinhole or aperture, which serve the function of concentrating the light falling onto each of the apertures from the projector 1 and focusing all that light through the associated pinhole. The back surface 4 of the lenslets layer 5 is shaped in such a way as to refract and direct the light coming in from the known angle to the desired direction that depends on the local angle of augmented surface 204 and the expected locations of the viewers of augmented surface 204. (For example an area on one side of the nose may be directed in one direction while a nearby area on the other side of the nose may be directed in another direction.) Adjacent lenslets (their rear and front curvatures, and distance between them) may be fabricated to point in different directions and have different fields of view to achieve the desired light distributions emanating from the augmented surface at each specific local area. The size of each lenslet should be several times smaller than a projector's pixel. As in the '289 Patent, the fabrication of the apertures can be achieved by first fabricating the lenslets layer 5 and then applying the flat black coating to the entire outer surface of the lenslets. Then a powerful energy source, like a scanning laser, is placed at the projector's location. Then the laser is scanned across the lenslets' surface. The focused energy should open apertures in the coating layer at precisely the same places where, later, light from the projector will exit.

In one embodiment of the subject matter described herein, lenslets layer 5 can be constructed along the complex curved surfaces of the augmented object. The shape, size, depth, and orientation of the lenslets can be designed to optimize the distribution of light emanating from various areas of the augmented surface, optimized for the desired appearance of the surface, and optimized also for the location and distribution of the expected viewers of the augmented surface making the apparent lighting on the augmented surface appear to be the same (or perhaps arbitrarily different) as the ambient lighting in the rest of the local environment may be achieved by constantly measuring the ambient light falling on various local areas of the augmented surface. As stated above, this ambient light is measured by placing a camera (3 in FIG. 2) inside the surface at the same optical location as projector 1. This can be achieved by placing beam splitter 2 in the optical path. As illustrated in FIG. 2, beam splitter 2 allows camera 3 to view ambient illumination of object 200 through aperture arrays 6 and to be physically offset from projector 1 so as not to block the projected image from being output through aperture arrays 6. To avoid the projector light overpowering the camera sensor, a solid state shutter 8 may be placed in front of the projector 1 and another solid state shutter 9 may be placed in front of the camera 3. At some regular rate (such as 60 Hz), the light from projector 1 is blocked by shutter 8 for a short fraction of the frame projector time and shutter 9 in front of the camera 3 is opened and the light coming in through the apertures is measured. The measurement of the ambient lighting on the augmented surface and the adjustment of the lighting of the projected image may be achieved by a projected image illumination adjustment module 202, which may be implemented in software in combination with hardware and/or firmware on a computer coupled to camera 3 and projector 1.

Projected image illumination adjustment module 202 may include a processor and associated memory for measuring the ambient light and adjusting the illumination light output from projector 1 based on the measured ambient light. Thus, projected image illumination adjustment module 202 may configure its associated processor to be a special purpose computer that improves the technological field of spatial illumination of augmented reality objects.

Not just the amount of ambient light can be measured, but since the precise geometry of the augmented surface is known, the directionality of the ambient light can also be estimated. The estimation of the directionality of the ambient light may also be performed by projected image illumination adjustment module 202 and used to adjust the directionality of the illumination of the projected image.

The size of the apertures (determined by the design of the lenslets surfaces and the power and ablation characteristics of the laser) can be changed to balance the needs of the camera for more light coming in, with the needs of the projection system to minimize reflection of ambient light off the augmented surface.

In order to take advantage of the camera-captured ambient illumination data, the overall system has to become more sophisticated about the capture of the image(s) that are to be projected onto the augmented surface. For example, consider the example of FIG. 1, where a remote live individual may be speaking, and the video stream of his face (talking) is projected onto the head-shape of the augmented surface. The problem is to capture the video images in such a way as to be able to "remove" his local lighting in the remote environment and "add" the lighting of the local ambient environment of the augmented surface (the surface onto which his video is projected). This is the classic relighting problem, with many excellent techniques. Rapid advances in higher speed cameras, LED lighting, and inexpensive commodity depth cameras (such as Kinect) make this capture of the user's lighting environment ever easier. The lighting of the environment of the captured video image may also be input to the projected image illumination adjustment module and used to adjust the illumination of the projected image.

Figure 3:
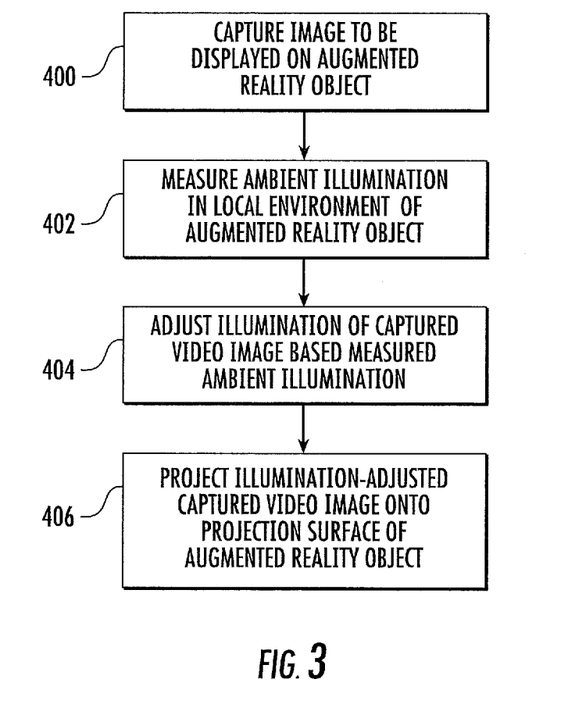
FIG. 3 is a flow chart of an exemplary method for improved illumination of a spatial augmented reality object according to an embodiment of the subject matter described herein.

FIG. 3 is a flow chart illustrating an exemplary process for illuminating a spatial augmented reality object according to an embodiment of the subject matter described herein. Referring to FIG. 3, in step 400, images to be displayed on an augmented reality object are captured. For example, one or more cameras 300 located in a remote environment from the augmented reality object may capture video images of a remote participant to a meeting or other event. In step 402, ambient illumination is measured in the local environment of the augmented reality object. The ambient illumination may be measured by camera 3 located within augmented reality object 200 or by a separate camera located in the local environment of augmented reality object 200. In step 404, illumination of the captured video images is adjusted based on the measured ambient illumination. In one example, the illumination of the captured video image may be modified to match the illumination of the local environment of the augmented reality object 200. Such matching may be achieved by removing the illumination created by the remote environment and then relighting the captured video image from the direction and with the intensity of the illumination in the local environment. In step 406, the illumination adjusted captured video image is projected on to the projection surface of the augmented reality object. For example, a projector which may be located within the augmented reality object may project the illumination adjusted image onto the illumination surface via lenslets layer 5 and pinhole arrays 6.

In an alternate implementation, projector 1 may illuminate the augmented reality object from the front or user facing side.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for illuminating a spatial augmented reality object, the system comprising:
    an augmented reality object including a projection surface having a plurality of apertures formed in the projection surface;
    a lenslets layer located behind the projection surface, including a plurality of lenslets, and conforming to curved regions of the projection surface for directing light through the apertures;
    a camera for measuring ambient illumination in an environment of the projection surface;
    a projected image illumination adjustment module for adjusting illumination of a captured video image based on the ambient illumination measured by the camera, wherein adjusting illumination of the captured video image includes changing illumination of the captured video image to match ambient lighting of the environment of the projection surface so that the captured video image appears to be lit from light sources in the environment of the projection surface; and
    a projector for projecting the illumination-adjusted captured video image through the projection surface via the lenslets layer and the apertures, wherein the projection surface is coated with an anti-reflective coating and wherein the projector is located within the augmented reality object and illuminates the augmented reality object from within the augmented reality object by projecting the illumination-adjusted captured video image from within the augmented reality object, through the lenslets layer, through the apertures, and to a region outside of the augmented reality object.

2. The system of claim 1 wherein the lenslets layer includes a back surface shaped to refract and direct light from the projector to a desired direction that depends on a local angle of the projection surface and expected locations of the viewers of the augmented reality object.

3. The system of claim 1 wherein at least some of the lenslets that are adjacent to each other are fabricated to point in different directions and have different fields of view to achieve desired light distributions emanating from specific local areas of the projection surface at each specific local area.

4. The system of claim 1 wherein each lenslet is sized to be several times smaller than a pixel of the projector.

5. The system of claim 1 wherein the camera is located at the same optical location as the projector.

6. The system of claim 5 comprising a first shutter located in front of the camera and a second shutter located in front of the projector, wherein, during measurement of the ambient light, the first shutter is opened and the second shutter is closed.

7. The system of claim 1 wherein the projected image illumination adjustment module is configured to measure intensity and directionality of the ambient illumination and to adjust the intensity and directionality of the illumination of the projected image based on the measured intensity and directionality.

8. The system of claim 1 wherein the projected image illumination adjustment module is configured to remove ambient illumination resulting from an environment of the captured video image.

9. The system of claim 1 wherein the augmented reality object includes a mannequin and wherein the captured video image includes a live video image of a human face.

10. A method for illuminating a special augmented reality object, the method comprising:
   capturing images to be displayed on an augmented reality object;
   measuring ambient illumination in a local environment of the augmented reality object;
   adjusting illumination of the captured images based on the measured ambient illumination, wherein adjusting illumination of the captured images includes changing illumination of the captured images to match ambient lighting of the local environment of the augmented reality object so that the captured images appear to be lit from light sources in the local environment of the augmented reality object; and
   projecting, using a projector, the illumination-adjusted captured images through a projection surface of the augmented reality object, wherein the projection surface is coated with an anti-reflective coating and wherein the projector is located within the augmented reality object and illuminates the augmented reality object from within the augmented reality object by projecting the illumination-adjusted captured images from within the augmented reality object, through a lenslets layer located behind the projection surface, through apertures in the projection surface, and to a region outside of the augmented reality object.

11. The method of claim 10 wherein capturing the images includes capturing images of a remote human participant and wherein the augmented reality object comprises a mannequin.

12. The method of claim 10 wherein measuring the ambient illumination includes measuring the ambient illumination using a camera in the local environment of the augmented reality object.

13. The method of claim 10 wherein adjusting the illumination of the captured images includes adjusting intensity and direction of the illumination of the captured images to match the ambient illumination in the local environment.

14. A non-transitory computer readable medium having stored thereon executable instructions that when executed by the processor of a computer control the computer to perform steps comprising:
   capturing images to be displayed on an augmented reality object;
   measuring ambient illumination in a local environment of the augmented reality object;
   adjusting illumination of the captured images based on the measured ambient illumination, wherein adjusting illumination of the captured images includes changing illumination of the captured images to match ambient lighting of the local environment of the augmented reality object so that the captured images appear to be lit from light sources in the local environment of the augmented reality object; and
   projecting the illumination adjusted captured images through a projection surface of the augmented reality object, wherein the projection surface is coated with an anti-reflective coating and wherein the projector is located within the augmented reality object and illuminates the augmented reality object from within the augmented reality object by projecting the illumination-adjusted captured images from within the augmented reality object, through a lenslets layer located behind the projection surface, through apertures in the projection surface, and to a region outside of the augmented reality object.

\* \* \* \* \*